May 6, 1924.                                               1,493,101
                        J. B. BUSHNELL
        IGNITION VOLTAGE CONTROL FOR INTERNAL COMBUSTION ENGINES
                       Filed Aug. 15, 1921
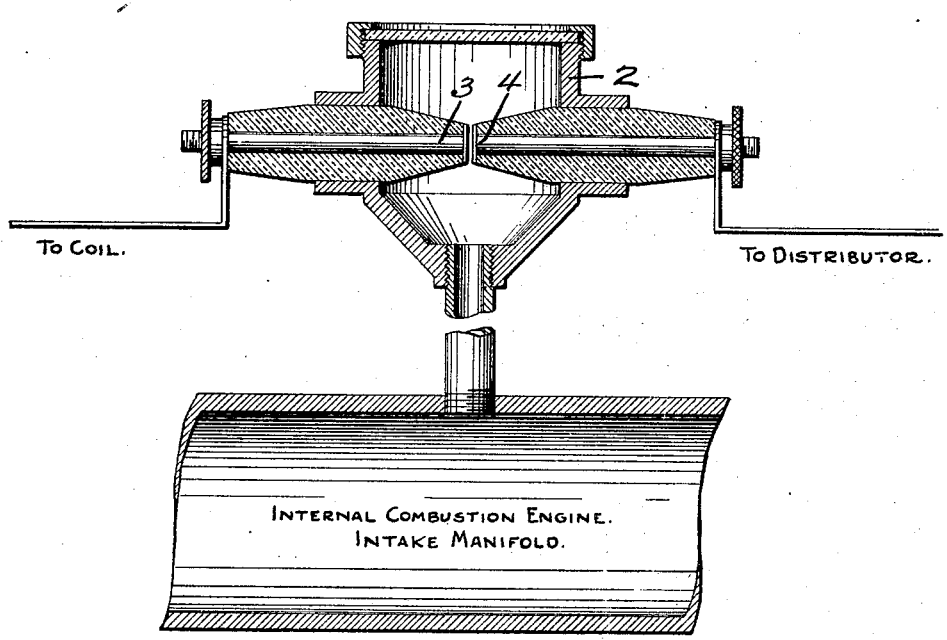
WITNESS                                        INVENTOR
                                            JOHN B. BUSHNELL
                                               BY
                                               his ATTORNEYS Patented May 6, 1924.

1,493,101

UNITED STATES PATENT OFFICE.

JOHN B. BUSHNELL, OF BERKELEY, CALIFORNIA.

IGNITION-VOLTAGE CONTROL FOR INTERNAL-COMBUSTION ENGINES.

Application filed August 15, 1921. Serial No. 492,606.

*To all whom it may concern:*

Be it known that I, JOHN B. BUSHNELL, a citizen of the United States, and a resident of Berkeley, county of Alameda and State of California, have invented a certain new and useful Ignition-Voltage Control for Internal-Combustion Engines, of which the following is a specification.

The invention relates to a device for controlling the voltage of the ignition spark in internal combustion engines equipped with storage battery ignition systems.

In such systems, as ordinarily used, the voltage of the spark remains constant, irrespective of the richness of the fuel or its rate of consumption. If, as is usually the case, the spark voltage is of the proper value for ordinary conditions of operation, then variations from these conditions cause the spark intensity or voltage to be improper, and in fact serious effects may be produced. A "fat" spark, or one produced by a high voltage, has the effect of causing the fuel to burn quicker than if a "lean" spark, or one produced by a relatively low voltage, is used. This effect is quite generally recognized, although of course the particular condition of the fuel itself has an effect upon the speed of combustion. As a concrete example, assume that the engine is running slowly with little load, the throttle being almost closed. Under such circumstances a fat spark is not objectionable, since the fuel mixture is lean, and therefore no undue violence of explosion can be obtained. Under full load, when the engine is rotating at high speed, and the throttle is open, a fat spark is advantageous for it is essential that the fuel be burned as rapidly as possible so as to eliminate as far as possible the waste of fuel and to obtain maximum power from the engine.

When it is attempted to change from one mode of operation to another, that is, when the throttle is opened so as to speed up the engine and make it take more load, the temporary transition period produces conditions which make a fat spark highly undesirable. When the throttle is opened the richness of the fuel is increased, but for the moment there is no corresponding increase in the speed of the engine. Instead there is merely a steady acceleration. The fat spark in conjunction with the rich fuel, causes very rapid combustion in the cylinders. The engine running comparatively slowly, the violence of the explosion is not taken up by the movement of the piston, but instead there are excessive strains produced in the operating parts of the engine. The strains produced in this way if long maintained, are very apt to have serious consequences. It is one of the objects of my invention to prevent these strains by so regulating the intensity of the spark that during these transition periods the spark has low intensity. I accomplish this result by placing a variable resistance in series in the high tension ignition circuit and increasing this resistance when the combustible mixture charge is too heavy for the engine speed.

When an internal combustion engine is operating, a reduction of pressure or partial vacuum is produced in the inlet manifold above the throttle. When the throttle is suddenly opened, this partial vacuum is greatly reduced, so that an overcharge of mixture is accompanied by a reduction of vacuum in the inlet manifold, and I employ this reduction of vacuum to decrease the voltage of the ignition spark. As soon as the speed of the engine increases, due to the throttle opening, the vacuum is again produced in the inlet manifold and the voltage of ignition spark raised.

It is therefore another object of my invention to vary the spark voltage in response to the pressure conditions in the inlet manifold of an engine.

In the accompanying drawing, I have shown one form of device for accomplishing this result, but it is to be understood that I do not limit myself to such form, since the invention, as set forth in the claims, may be embodied in a plurality of forms.

The drawing is a longitudinal section of a device embodying my invention, in its environments.

The device comprises a closed casing 2, adapted to be connected to the inlet manifold of an internal combustion engine, so that the same conditions of pressure exist therein as in the manifold. Arranged in the casing and insulated therefrom and from each other, are two electrodes 3—4, the adjacent ends of which are spaced apart slightly, for instance, one-sixteenth of an inch, within the casing, forming an air gap between the electrodes. The resistance of the air gap varies with the pressure in the casing, that is, at atmospheric pressure the resistance is greater than when a partial vacuum exists in the casing. The electrodes are connected in series in the high tension ignition conductor, preferably between the coil and the distributor, so that a variable resistance is thus interposed in the high tension ignition circuit. When the throttle is suddenly opened, the pressure in the casing increases, increasing the resistance of the air gap and decreasing the tension of the ignition spark.

I claim:

1. The method of varying the voltage of an ignition spark of an internal combustion engine provided with battery ignition which comprises varying the resistance of the ignition circuit in accordance with variations in pressure in the inlet manifold of the engine.

2. In an internal combustion engine having a fuel intake, an ignition circuit, and a source of substantially constant electromotive force for the circuit, the method of compensating for varying conditions of operation of the engine, which comprises varying the resistance of the ignition circuit in accordance with the variation in pressure in the fuel intake.

3. In an internal combustion engine having a fuel intake, an ignition circuit, and a source of substantially constant electromotive force for the circuit, the method of compensating for varying conditions of operation of the engine, which comprises increasing the resistance of the ignition circuit in accordance with the increase in pressure in the fuel intake.

4. A device for controlling the voltage of the ignition spark of an internal combustion engine provided with battery ignition, comprising a pair of spaced contacts in the ignition circuit, a casing enclosing said contacts and means for varying the pressure within said casing.

5. A device for controlling the voltage of the ignition spark of an internal combustion engine provided with battery ignition, comprising a casing adapted to be connected to the inlet manifold of the engine so that pressure variations produced in the manifold are communicated to the chamber and a pair of spaced electrodes in said casing connected in the ignition circuit.

6. In combination, an internal combustion engine having a fuel inlet, an ignition circuit for the engine, a source of substantially constant electromotive force for the circuit, and means for varying the resistance of the circuit in accordance with variations in pressure in the fuel inlet.

7. The combination with an internal combustion engine having a battery ignition system, of a closed casing communicating with the inlet manifold of the engine and spaced electrodes in said casing connected in series in the ignition circuit.

8. In an internal combustion engine, a spark ignition system, a fuel inlet, and means for varying the voltage across the spark in response to the pressure variations in the inlet.

In testimony whereof, I have hereunto set my hand.

JOHN B. BUSHNELL.